United States Patent
Sick et al.

(10) Patent No.: US 11,541,585 B2
(45) Date of Patent: Jan. 3, 2023

(54) POLYMER COEXTRUSION HEAD WITH A DUAL-CHANNEL NOZZLE

(71) Applicants: Polytex Sportbelage Produktions-GmbH, Grefrath (DE); Sima S.R.L., Castelfranco Emilia (IT)

(72) Inventors: Stephan Sick, Willich-Neersen (DE); Dirk Sander, Kerken (DE); Ivo Lohr, Kempen (DE); Andrea Zucconi, Sasso Marconi (IT)

(73) Assignees: Polytex Sportbelage Produktions-GmbH, Grefrath (DE); Sima S.R.L., Modena (IT)

( * ) Notice: Subject to any disclaimer, the term of this patent is extended or adjusted under 35 U.S.C. 154(b) by 210 days.

(21) Appl. No.: 16/758,696

(22) PCT Filed: Nov. 2, 2018

(86) PCT No.: PCT/EP2018/080055
§ 371 (c)(1),
(2) Date: Apr. 23, 2020

(87) PCT Pub. No.: WO2019/086632
PCT Pub. Date: May 9, 2019

(65) Prior Publication Data
US 2020/0340142 A1   Oct. 29, 2020

(30) Foreign Application Priority Data
Nov. 3, 2017  (EP) .................................... 17199907

(51) Int. Cl.
*B29C 48/05* (2019.01)
*B29C 48/30* (2019.01)
(Continued)

(52) U.S. Cl.
CPC .............. *B29C 48/05* (2019.02); *B29C 48/21* (2019.02); *B29C 48/30* (2019.02); *D01D 5/34* (2013.01)

(58) Field of Classification Search
CPC ....... B29C 48/05; B29C 48/154; B29C 48/16; B29C 48/21; B29C 48/22; B29C 48/30;
(Continued)

(56) References Cited

U.S. PATENT DOCUMENTS

| 3,725,192 A | 4/1973 | Ando et al. |
| 4,059,949 A | 11/1977 | Lee |

(Continued)

FOREIGN PATENT DOCUMENTS

| DE | 102013011956 A1 | 2/2014 |
| EP | 0995822 A1 | 4/2000 |

(Continued)

OTHER PUBLICATIONS

Office Action for Japanese Application No. 2020-524370 dated Feb. 1, 2022 and English translation.

(Continued)

*Primary Examiner* — Manley L Cummins, IV
(74) *Attorney, Agent, or Firm* — Harness, Dickey & Pierce, P.L.C.

(57) ABSTRACT

A coextrusion head for manufacturing a bicomponent polymer fiber, comprising a first inlet for receiving a core polymer component, a second inlet for receiving a cladding polymer component, and a dual-channel nozzle comprising an inner channel and an outer channel encompassing the inner channel. The inner and outer channel are in hydraulic connection with the first and second inlet, respectively. The dual-channel nozzle further comprises a joining path establishing a hydraulic connection between the inner channel, the outer channel, and a nozzle outlet of the dual-channel (Continued)

nozzle. The joining path is adapted for bringing the core polymer component and the cladding polymer component into contact with each other such that a contact layer comprising a mixture of the core polymer component and the cladding polymer component is formed between the core polymer component and the cladding polymer component.

6 Claims, 5 Drawing Sheets

(51) Int. Cl.
    *B29C 48/21*     (2019.01)
    *D01D 5/34*     (2006.01)

(58) Field of Classification Search
    CPC ... B29C 48/3003; B29C 48/34; B29C 48/345; D01D 4/027; D01D 5/34
    See application file for complete search history.

(56) References Cited

U.S. PATENT DOCUMENTS

| | | | |
|---|---|---|---|
| 4,678,274 A * | 7/1987 | Fuller | C03B 37/0235 385/128 |
| 2002/0130434 A1 | 9/2002 | Rigali et al. | |
| 2010/0078848 A1 | 4/2010 | Gabriele et al. | |

FOREIGN PATENT DOCUMENTS

| | | | |
|---|---|---|---|
| EP | 3116942 A2 | | 1/2017 |
| JP | S49056216 A | | 5/1974 |
| JP | S62118178 A | | 5/1987 |
| JP | S62-118178 U | | 7/1987 |
| JP | H04202806 A | | 7/1992 |
| JP | H09157959 A | | 6/1997 |
| JP | 2008106410 A | | 5/2008 |
| KR | 100990991 | * | 10/2010 |
| KR | 100990991 B1 | | 10/2010 |

OTHER PUBLICATIONS

International Preliminary Report on Patentability and Written Opinion for PCT/EP2018/080055 dated May 14, 2020.
Office Action for Japanese Application No. 2020-524370 dated Jul. 27, 2021 and English translation.
International Search Report PCT/ISA/210 for International Application No. PCT/EP2018/080055 dated Jan. 21, 2019.
Written Opinion PCT/ISA/237 for International Application PCT/EP2018/080055 dated Jan. 31, 2019.
Japanese Office Action dated Jul. 26, 2022 for corresponding Japanese Application No. 2020-524370, and English-language translation thereof.

* cited by examiner

POLYMER COEXTRUSION HEAD WITH A DUAL-CHANNEL NOZZLE

This application is a national phase under 35 U.S.C. § 371 of PCT International Application No. PCT/EP2018/080055, which has an International filing date of Nov. 2, 2018, which claims priority to European Patent Application No. 17199907.1 filed Nov. 3, 2017, the entire contents of each of which are hereby incorporated by reference.

FIELD OF THE INVENTION

The invention relates to an extrusion device, and more specifically, a device for coextruding a bicomponent polymer fiber from two polymer components.

BACKGROUND OF THE INVENTION

Extrusion is a widespread method for manufacturing polymer fibers. In the simplest case, fluid polymer melt is pressed through a microscopic circular opening to form a circular-cylindrical fiber. However, applications exist where polymer fibers with a non-circular cross section are preferable. The straightforward approach of changing the shape of the extrusion opening is known to work as long as the flow through the extrusion opening is laminar. The shape of the coextrusion opening is a factor which influences laminarity. Especially if the shape has a large gradient in thickness, i.e. a transition between a thick and a thin region on a short distance, turbulent instability may form in the polymer flow and result in discontinuities and/or defects of the product.

Bicomponent polymer fibers can be formed by simultaneous extrusion of two polymer components (coextrusion). In the joint fiber, the two components are separated by an interfacial surface. This surface is subject to wear due to ageing and external influences. Eventually, the two components may delaminate, such that the bicomponent fiber may get separated with negligible effort. This effect is especially pronounced if the two components are based on polymers of different polarity, such as polar polyamide and non-polar polyethylene.

Therefore, it would be desirable to have a coextrusion device which is adapted for producing a bicomponent polymer fiber with a reduced risk of delamination. Preferably, the coextrusion device were also adapted for producing such bicomponent fiber with a reduced number of discontinuities.

German patent application DE 10 2013 011 956 A1 discloses a spinneret device for producing bicomponent polymer filaments, wherein the core polymer component is conveyed through a central tube and the cladding polymer component is conveyed through hydraulic throttle joints.

INVENTION SUMMARY

In the independent claims, the invention provides for a coextrusion head and a system for manufacturing a bicomponent fiber with a reduced risk of delamination. Embodiments are given in the dependent claims.

In one aspect, the invention provides for a coextrusion head for manufacturing a bicomponent polymer fiber, the coextrusion head comprising a first inlet for receiving a core polymer component, a second inlet for receiving a cladding polymer component, and a dual-channel nozzle, the dual-channel nozzle comprising an inner channel and an outer channel encompassing the inner channel, the inner channel being in hydraulic connection with the first inlet, the outer channel being in hydraulic connection with the second inlet, the dual-channel nozzle further comprising a joining path, the joining path establishing a hydraulic connection between the inner channel, the outer channel, and a nozzle outlet of the dual-channel nozzle, the joining path being adapted for bringing the core polymer component and the cladding polymer component into contact with each other such that a contact layer is formed between the core polymer component and the cladding polymer component in response to simultaneously receiving the core polymer component from the inner channel and the cladding polymer component polymer from the outer channel, the contact layer comprising a mixture of the core polymer component and the cladding polymer component.

The coextrusion head is adapted for producing a bicomponent fiber with a core made from core polymer component and cladding made from cladding polymer component. Both components comprise a major portion of a core polymer or, respectively, a cladding polymer, which are miscible with each other in fluid state. The core polymer and the cladding polymer may each be a pure polymer or a mixture of two or more polymers. Core polymer and cladding polymer are miscible, but may differ in terms of polarity. In an example, the core polymer is polyamide, which is polar, and the cladding polymer is polyethylene, which is non-polar.

In particular, the core polymer component may be a mixture of at least two polymer phases, wherein an additional polymer is to be extruded into the core of the bicomponent fiber together with the core polymer such that it may form beads, threads, or other filamentary structures as the fiber is manufactured. More particularly, the additional polymer may be immiscible with the core polymer, such that a compatibilizer can be extruded into the core as a third polymer phase for interfacing the additional polymer and the core polymer. Generally, the core polymer component may be a polymer mixture, a master batch, or a compound batch as disclosed in European patent application EP 3116942 A1.

The core polymer component and/or the cladding polymer component may also comprise additives, including, but not limited to, at least one of the following: a wax, a dulling agent, a UV stabilizer, a flame retardant, an anti-oxidant, a fungicide, a pigment, and combinations thereof.

The coextrusion head comprises a dual-channel nozzle. Compared to coextrusion with single-channel nozzles only for the core component, mounted in boreholes with extrusion openings, the boreholes acting as outer channels for guiding the cladding component towards the extrusion openings, the described dual-channel nozzles may allow for a simplified design of the heating parts for the smallest channels, which may enable a miniaturization of the coextrusion head. Moreover, the dual-channel nozzles can be machined with small tolerances, which may lead to an improved reproducibility and smaller variations of product properties such as contact layer thickness of bicomponent fibers produced with different nozzles.

The dual-channel nozzle comprises a joining path which is adapted for forming a contact layer between core and cladding. Within the scope of this disclosure, the term "joining path" designates, for example, a channel structure inside of a dual-channel nozzle of a coextrusion head which is in hydraulic connection with the first inlet via the inner channel, the second inlet via the outer channel, and an extrusion opening of the head via the nozzle outlet, wherein the joining path is the channel structure where, during coextrusion operation of the coextrusion head, the melted core polymer component and the melted cladding polymer component come into physical contact with each other for the first time. The joining path is a structural unit of the channel structures inside a dual-channel nozzle which can be discerned from other structural channel units by its position interfacing the inner channel, the outer channel, and the nozzle outlet. Typically, while not mandatory, the joining path may also comprise further structural peculiarities such as a diameter transitioning from that of the outer channel to that of the nozzle outlet.

The joining path is designed such that, when these two miscible polymers come into contact, they mix with each other in an interfacing zone herein referred to as the "contact layer". It is pointed out that the effect of providing a bicomponent fiber with a contact layer where the materials of the core and cladding components are intermixed is not solely a process feature, but rather the result of a structural feature of the dual-channel nozzle which defines a parameter space for the coextrusion process within which core-cladding intermixing takes place in a manner which is sufficiently controlled to yield the desired result (the contact layer).

According to embodiments, the dual channel nozzle is designed such that the flow of two adjacent coextrusion components results in the formation of a uniform, small-scale contact layer comprising a mixture of both components at the interface of the two components for at least one set of process parameter ranges. In particular, the occurrence of controlled, small-scale intermixing of the two coextrusion components (i.e., the core polymer component and the cladding polymer component) may be the result of an appropriate choice of dimensions of the joining path relative to one or more adjacent channel structures (the outer channel, the inner channel, and the nozzle outlet) and/or relative to a respective design flow velocity in each of the inner channel and the outer channel in response to a respective design feed velocity through each of the first inlet and the second inlet; the spatial arrangement of the inner channel, the outer channel, and the nozzle outlet relative to each other; the spatial arrangement of discharge openings of the inner channel and the outer channel towards the joining path; and the dimensions of the inner channel, the outer channel, and the nozzle outlet.

The flow pattern for both coextrusion components through the joining path is thus defined by structural features of the dual-channel nozzle and the joining path which, without limitation to those structural features explicitly mentioned herein, should be chosen such that the core and cladding polymer components intermix in an interfacial contact layer between core and cladding for at least one set of process parameter ranges.

During production of the bicomponent polymer fiber, the two components are heated to a liquid state, joined together in the joining path, and pressed through an extrusion opening of the coextrusion head. When the bicomponent fiber precursor thus formed by the coextrusion is cooled down, the two polymers solidify so that the contact layer forms a solid connection between both components which is void of any contact surface. The contact layer forms a three-dimensional, quasi-monolithic structure which may comprise a gradual transition of polymer types, i.e. the number density of molecules of the core polymer component gradually decreases from the core outward and the number density of molecules of the cladding polymer component analogously decreases from the cladding inward. In the special case of identical core and cladding polymers, the number density of polymer molecules remains constant, while only the concentration of additives, which may be present in only one of the interfacing components, forms a gradient towards the respective other component.

Hence, the joining path is adapted for connecting core and cladding by a substance-to-substance bond formed by a polymer mixture which is held together by intermolecular forces which may be stronger than purely adhesive forces acting across two different adjacent, but not intermixed polymers. The molecules of the two polymers are bonded together by topologic entanglement and intermolecular forces similar to the cohesive intermolecular forces present in a monocomponent fiber. A bicomponent fiber produced with a coextrusion head according to embodiments of the invention may therefore be more resistant to shear stress acting in axial direction of the fiber and will therefore be less likely to core-cladding delamination. Such bicomponent fiber may therefore feature an improved wear resistance.

By means of the dual-channel nozzle, the coextrusion head is adapted for producing cylindrical polymer fibers, where the term "cylindrical" denotes a general right cylinder, i.e. having its primary axis oriented perpendicular to its base plane or cross section. Specifically, each fiber produced can be a non-circular cylinder, i.e. having a non-circular cross section. Examples of a non-circular cross section include an ellipse or a polygon. It is understood that the cross sections of core and cladding may be selected independently from each other, and that each of the core and the cladding may have a non-circular cross section. In a non-limiting example, the core has a triangular cross section, while the cladding has a circular cross section. In another non-limiting example, an elliptical core is surrounded by a bean-shaped cladding. In yet another non-limiting example, the fiber has a circular core and a cladding with two protrusions extending away from the core with a length of at least the core diameter.

Another advantage may be that no compatibilizers or other interfacing material layers are needed to bring core and cladding into contact. This may yield a simplified design of the coextrusion head and allow for a simpler and more cost-effective production of the bicomponent fibers.

The joining path may be designed such that a stable turbulent flow occurs between the core polymer component and the cladding polymer component. Size and dynamics of the turbulence may be responsive to the particular choice of materials and/or process parameters for the coextrusion process. Said parameters may include the feed rate of one or both components, the difference in feed rates, temperature, pressure, and/or viscosity of one or both components at a given temperature and/or pressure.

The structure and dimensions of the joining path are sized and shaped such that a stable turbulence occurs. Structures and dimensions of the joining path, the inner channel and the outer channel upstream of the joining path are chosen such that a stable turbulence between core polymer component and cladding polymer component (which are referenced together as "the coextrusion components" herein) is formed. Applicant has observed that the dimensions disclosed herein provide a stable contact zone with a desired thickness for most of the polymer types used in the production of artificial turf fibers, e.g. polyethylene and polyamide. In some cases, the dimensions of the ducts and other elements of the extrusion head may be adapted slightly to other types of polymers.

The creation of the mixture of the coextrusion components defining the contact layer may also be influenced by the length $x_1$ of the joining path. Starting from the location of its induction, the turbulence may spread over the length of the joining path rather than staying confined to said location of induction. Applicant has observed that the co-extrusion process involves a risk that the dimensions of the turbulence (e.g., a vortex diameter) may vary over the axial length of the joining path. A too long joining path may lead to instability of the turbulence such that the thickness of the contact layer may become variable and/or the components may partially segregate again, while a too short joining path may result in insufficient mixture of the coextrusion components. Therefore, the size and shape of the components of the dual channel nozzle, in particular the joining path length $x_1$, should be chosen as described herein for embodiments of the invention to ensure that the thickness and/or the mixing degree of the contact layer are kept within desired boundaries.

According to embodiments, the joining path is confined by a conical taper of the dual-channel nozzle. A tapered joining path may stabilize mass flow laminarity for the cladding component, such that turbulence in the contact zone, which is needed to obtain a contact layer containing a mixture of core polymer and cladding polymer, may be controlled through temperature and/or feeding velocity without feedback to the cladding polymer mass flow.

According to embodiments, the inner channel has a circular cross section, the joining path has an axial length $x_1$ between the nozzle outlet and the inner channel, the axial length $x_1$ being 3 to 7 times the diameter of the inner channel. According to embodiments, the inner channel has a circular cross section with a diameter between 0.5 and 1.5 mm, preferably of 1.25 mm.

This may allow for adjusting the dimensions at the joining path to the specific properties, such as viscosity or shear modulus, of the polymer components to be brought into contact and to the specific process parameters, like temperature or pressure, to provide beneficial rheological properties for establishing a firm bond between core and cladding of the bicomponent fiber. If the length of the joining path is chosen too long, turbulence may get suppressed by feedback of increased wall-polymer interaction. On the other hand, a too short joining path may destroy stability of the turbulence such that the contact layer becomes variable e.g. in thickness and position. A bicomponent fiber produced with a too short joining region may show no beneficial surface properties anymore which are supposed to arise from a clear distinction between core and cladding.

According to embodiments, the coextrusion head further comprises an extrusion opening and a coextrusion path, the coextrusion path establishing a hydraulic connection between the nozzle outlet and the extrusion opening, the coextrusion path being adapted for simultaneously receiving the core polymer component, the cladding polymer component and the contact layer from the nozzle outlet such that a coextruded polymer strand is formed in the coextrusion path, the coextruded polymer strand comprising a core, a cladding encompassing the core, and the contact layer interfacing the core and the cladding.

A coextrusion path downstream of the joining path may advantageously provide a channel where the joined polymer strand is allowed return to laminar flow. This may enable forming the outer contour of the fiber in a separate step which is free from the turbulences which were needed to form the contact layer. Joining cladding and core together and forming the cladding into its final shape may thus be considered as separate process steps, allowing for a finer control of the process parameters to produce the bicomponent polymer fiber with stable and reproducible properties. A laminar flow upstream of the extrusion opening may be desirable as it may yield a smooth and homogeneous contour along the whole length of the product. This may be especially beneficial for fibers with thin edges.

According to embodiments, the extrusion opening has a non-circular cross section and the coextrusion path has the non-circular cross section. According to embodiments, the joining path has a circular cross section.

A coextrusion path shaped with the desired contour of the finished fiber to be produced may allow for forming the coextruded polymer strand emerging from the dual-channel nozzle into a non-circular shape. In a preferable example, the coextruded polymer strand emerges from the dual-channel nozzle with a circular cross section and is shaped into a non-circular cross section by the coextrusion path. For instance, the non-circular cross section of the coextruded polymer strand may be symmetric, repetitive, or irregular; polygonal, elliptic, lenticular, flat, pointed or elongated. The nozzle outlet may contact the coextrusion path directly, such that the pressure-retaining condition imposed by the nozzle is locally relaxed, allowing the cladding polymer component to spread into non-circular parts of the profile. A non-circular cross section may thus enable a great variety of shapes for the bicomponent polymer fiber with a reduced risk of delamination, which may increase the number of possible applications.

According to embodiments, the coextrusion path has an axial length $x_2$ between the nozzle outlet and the extrusion opening.

According to embodiments, the axial length $x_2$ is selected such that the cladding fills the non-circular cross section at the extrusion opening. This may allow for adjusting the length of the coextrusion path to an optimum which is long enough to enable the cladding to fill the contour of the extrusion opening completely and to assume a directed flow in axial direction over the whole cross section of the opening, but as short as possible to minimize friction loss. This may contribute to the smoothness and stability of the outer cladding surface of the finished polymer fiber leaving the extrusion opening. A too short coextrusion path may cause turbulence at the extrusion opening such that the contour of the fiber emerging the extrusion opening reverts to a circular cross section instead of keeping the non-circular cross section.

According to embodiments, the axial length $x_2$ is between 1.5 and 4.0 mm. This range may be a beneficial choice for several polymer materials which are commonly used to produce artificial polymer fibers, such as polyethylenes or polyamides. The length of the coextrusion path may be chosen from this range to reflect the viscosity of the coextruded polymer strand and the process parameters. A polymer with a low viscosity at a design process temperature may need a shorter coextrusion path as it fills the contour of the extrusion opening more easily than a high-viscosity polymer. Especially if the two components are coextruded at different feed rates, the length of the coextrusion path may be adapted to an effective viscosity of the coextruded polymer strand as a whole rather than the viscosity of the pure cladding polymer component because laminar core-cladding interaction may influence the space required for filling the contour.

According to embodiments, the axial length $x_1$ of the joining path is between 5 and 50 percent of the axial length $x_2$ of the coextrusion path. For a given choice of polymer component materials and design process parameters, independently determined ideal path lengths $x_1$ and $x_2$ may typically have a ratio within this range. Therefore, the design of the coextrusion head may be simplified e.g. by selecting a suitable joining path length $x_1$ for the chosen polymer component materials and design process parameters from the $x_1$ range stated further above, and deriving a matching coextrusion path length $x_2$ using a suitable ratio from said range. A smaller ratio $x_1:x_2$ may be beneficial for scenarios where it is to be expected that laminar core-cladding interaction in the coextrusion path leads to a larger effective viscosity of the coextruded polymer strand compared to the viscosity of the pure cladding polymer component, and vice versa.

According to embodiments, the coextrusion head comprises at least two of the dual-channel nozzle and a hierarchical stack of channel plates, each of the channel plates comprising first channels and second channels, the first channels establishing the hydraulic connection between the first inlet and each inner channel of the at least two dual-channel nozzles, the second channels establishing the hydraulic connection between the second inlet and each outer channel of the at least two dual-channel nozzles, the number of channels per channel plate being constant or increasing in downstream direction.

The core polymer component and the cladding polymer component are fed to the coextrusion head through a respective inlet (usually one inlet per component) and distributed to the dual-channel nozzles through the respective first and second channels. As the total polymer flux per channel plate is constant, the channel number increases with every branch from the inlet towards the nozzles, and the specific width or diameter of the channels for a subsequent hierarchy level decreases accordingly. For a given channel plate, the level-specific channel width is thus smaller than the respective specific channel width or diameter in the channel plate(s), if present, of a preceding (upstream) level, and larger than the respective specific channel width or diameter in the channel plate(s), if present, of a following (downstream) level. As an example, the first and second channels in a particular channel plate chosen from the middle of the coextrusion head may have half the cross section of the first and second channels, respectively, in the channel plate directly preceding the channel plate under consideration, while having twice the cross section of the first and second channels, respectively, in the channel plate directly following the channel plate under consideration.

The coextrusion head may further comprise pressure chambers for each component which may yield a more homogeneous pressure distribution in downstream channels. A pressure chamber is essentially a large cavity hydraulically interconnecting several channels of one channel type. Preferably, a pressure chamber spans nearly a whole width of the coextrusion head, such that it matches at least one parallel arrangement of coextrusion nozzles along that width. Homogeneously feeding the whole length of a pressure chamber may require a parallel arrangement of upstream channels of a suitable width or hierarchy step. The channels downstream the pressure chamber may be on the same or next hierarchy step as the upstream channels feeding the pressure chamber, such that the hierarchy is not affected by the presence of the pressure chamber. This may yield a more homogeneous material flow through the coextrusion head, such that pressure variations for both coextrusion components are minimized and a consistent quality is achieved for all bicomponent fibers that are coextruded in parallel.

It is understood that the channels on each channel plate are usually machined as half channels on either face of the plate, with a mirroring layout of the half channels on subsequent plates such that the half channels on two adjacent faces of directly subsequent plates yield full channels as the plates are joined together.

According to embodiments, the channel plates are detachable from and reattachable to each other. This may facilitate cleaning and/or maintenance of the coextrusion head.

According to embodiments, the at least two dual-channel nozzles are exchangeable parts, the one of the channel plates at the most downstream position within the hierarchy of channel plates being an extrusion plate, at least one of the channel plates preceding the extrusion plate comprising a through hole for each of the at least two dual-channel nozzles, the extrusion plate comprising a heating channel for each of the at least two dual-channel nozzles, the heating channels and the through holes being arranged in their respective plates such that they align with each other to form cavities, each cavity comprising one of the at least two dual-channel nozzles, each of the heating channels further comprising an extrusion opening, the extrusion opening being in hydraulic connection with the nozzle outlet of the dual-channel nozzle contained in the cavity formed by said heating channel.

The dual-channel nozzles may be implemented as exchangeable parts which may be replaced at the end of a life cycle. This may avoid having to clean parts with narrow (typically millimeter-scale) channels. Exchangeable nozzles may also facilitate a faster and more economic recovery from defects or non-conformances as only affected nozzles have to be exchanged instead of replacing a whole extrusion plate. Exchangeable dual-channel nozzles are preferably installed in the coextrusion head by insertion into respective through holes of a channel plate upstream of the extrusion plate.

Preferably, the hydraulic connection between nozzle outlet and extrusion opening is established by a direct contact of the nozzle tip (the wall surrounding the nozzle outlet) with the heating channel (e.g. the bottom of the heating channel surrounding the extrusion opening), so that no additional parts are needed for sealing the hydraulic connection. This may require precise machining of the dual-channel nozzles (e.g. regarding their axial length) and/or the channel plates (e.g. regarding positioning the through holes through which the exchangeable nozzles are inserted into the heating channels).

According to embodiments, the heating channel comprises a recess for receiving the dual-channel nozzle. This may improve the positioning precision of the nozzle on the coextrusion opening or coextrusion path. In addition, a recess may simplify assembly or reassembly of the head, and it may increase the tightness of the hydraulic connection between nozzle and coextrusion opening or coextrusion path.

According to embodiments, the channel plates are adapted for pyrolytic removal of polymer rests at temperatures between 450 and 750° C. This may have the advantage that a mechanical cleaning may be omitted or reduced to a minimum, which may extend the lifetime of the channel plates and/or reduce maintenance times of the coextrusion head. Suitability for pyrolysis may be achieved by manufacturing the channel plates from a suitable material (e.g. stainless steel) and/or equipping the plates with a coating which is resistant to the desired pyrolysis temperatures.

According to embodiments, the dual-channel nozzle is adapted for working temperatures between 180 and 270° C. This may have the advantage of an improved resistance to thermal ageing and/or a reduced chemical interaction with the coextruded polymer components. Suitable materials may be metals or metal alloys (e.g. stainless steel or aluminum) or ceramic materials. Preferably, the dual-channel nozzle has the same thermal expansion coefficient as the channel plates to make the tightness of hydraulic connections independent of temperature.

According to embodiments, the dual-channel nozzle is an exchangeable part. This may yield the benefit of decoupling the manufacturing of those parts responsible for forming the core-cladding contact layer from the assembly of the coextrusion head. For instance, the dual-channel nozzle may be manufactured in a process which is not implementable or compatible with a given coextrusion head or its manufacturing method. In this way, the quality of the contact layer (including e.g. the degree of mixing of the core polymer mixture and the cladding polymer component inside the contact layer and/or the stability of its thickness) may be improved and made more reliable as it may depend less strongly on the manufacturing or assembly quality of the coextrusion head (e.g., the precision of positioning the nozzle within a receiving cavity).

Exchangeable dual-channel nozzles may also simplify the assembly of the coextrusion head or its reassembly when the head is disassembled e.g. for maintenance or cleaning. Furthermore, exchangeable nozzles may simplify the cleaning of a disassembled head, as the dual-channel nozzles, being among those parts of the head with the smallest channel diameter, may get replaced instead of being cleaned.

Exchangeable dual-channel nozzles may also allow for keeping one or more sets of spare nozzles. This may enable to reuse the nozzles instead of disposing of them. In an example, a used first set of the dual-channel nozzles is removed from the head and replaced by a clean second set of the nozzles while the head is disassembled for cleaning. In this way, operation of the coextrusion head may be continued while the first set is subject to external cleaning for future reuse.

Once more considering the influence of the dimensions and structure of the joining path on the formation of a stable, continuous and well-defined contact layer, an additional advantage of exchangeable dual-channel nozzles becomes apparent: Exchangeable dual-channel nozzles may allow for keeping ready different sets of dual-channel nozzles, wherein each set comprises nozzles which are dedicatedly structured for a particular combination of coextrusion components. Like the joining path, also the structures and dimensions of the inner and outer channel of the dual-channel nozzle can be dedicatedly developed for each particular combination of coextrusion components, e.g. choosing a larger cross-sectional area for a channel which is designated to transport a coextrusion component with a higher viscosity, and vice versa.

According to embodiments, the inner channel and the outer channel have a circular cross section, the inner channel comprising a terminal section of constant diameter opening out into the joining path, the outer channel surrounding the terminal section of the inner channel concentrically and with a constant diameter. According to embodiments, the terminal section of the inner channel has an axial length of at least ten times the diameter of the terminal section of the inner channel. According to embodiments, the joining path (106) has an axial length $x_1$ between the nozzle outlet (108) and the inner channel (102), the terminal section of the inner channel (102) having an axial length between two and fifteen times the axial length $x_1$ of the joining path (106).

These embodiments may have the advantage of ensuring that, in response to the joining path simultaneously receiving the core polymer component from the inner channel and the cladding polymer component from the outer channel, both coextrusion components are introduced into the joining path in a laminar flow. In this way, a controlled initial condition may be created, which in turn may provide a higher amount of control over the physical conditions governing the turbulent flow creating the contact layer.

In another aspect, the invention provides for a coextrusion system comprising the coextrusion head according to embodiments of the invention, a first feeder for feeding the core polymer through the first inlet, and a second feeder for feeding the core polymer through the second inlet.

Said feed rate ranges include feeding the core polymer component at a greater feed rate than the cladding polymer component. This may have the advantageous effect that the flow in the joining path is maintained at a stable, small-scale turbulence. This may support the formation of the thin contact layer of constant thickness between core and cladding where the core polymer and the cladding polymer are intermixed. Eventually, the configuration may provide a bicomponent polymer fiber with increased shear stability.

SHORT DESCRIPTION OF THE FIGURES

In the following, embodiments of the invention are explained in greater detail, by way of example only, making reference to the drawings in which.

DETAILED DESCRIPTION

Conventional bicomponent polymer fibers consist of two polymer components formed into a monofilament where the two components are adhesively connected with each other. Such fibers may be produced by simultaneous extrusion (coextrusion) of the two polymer components. As wear and ageing may lead to degradation or loss of the adhesive connection (delamination), it would be desirable to have a coextrusion device which allows for producing bicomponent polymer fibers with a stronger connection of the two polymer components.

Figure 1:
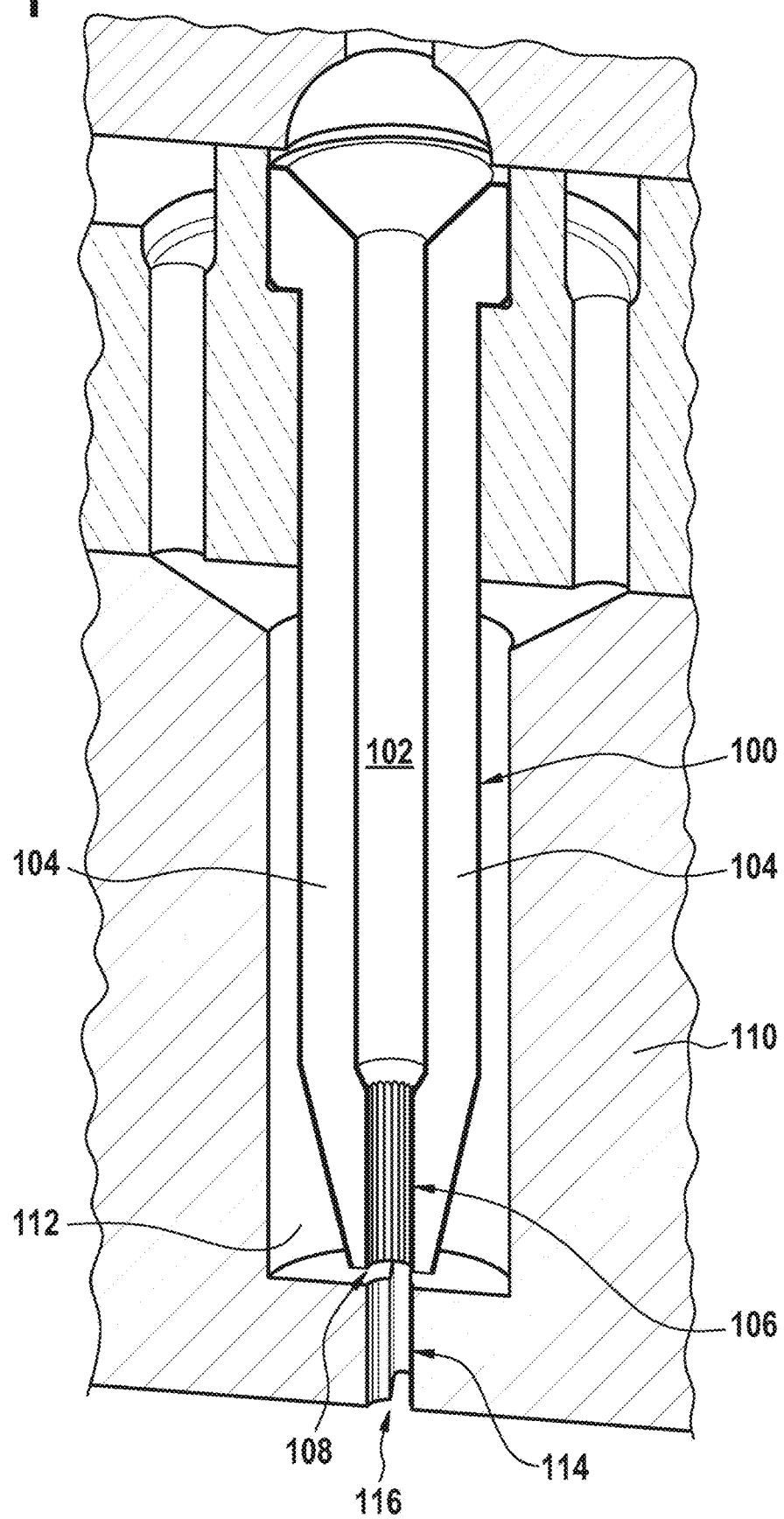
FIG. 1 shows a schematic cut through a dual-channel nozzle.

A preferable design of a dual-channel nozzle 100 mounted in a cavity of a coextrusion head is shown in FIG. 1. If the coextrusion head is implemented as a stack of channel plates, each cavity of the coextrusion head may be formed by a heating channel in the extrusion plate and through holes of at least one plate upstream of the extrusion plate, wherein the through holes are aligned to the heating channel. The dual-channel nozzle 100 in FIG. 1 is inserted into a heating channel 112 of an extrusion plate 110 through an aligned through hole of the channel plate mounted on top of the extrusion plate 110. The heating channel 112 is adapted for further comprising a heating (not shown) for keeping the nozzle 100 and, thus, the two polymer components at a predefined temperature. Heating the nozzle 100 may beneficially avoid obstruction of the narrow capillary channels 102, 104 inside the nozzle due to adhesion of the polymer components to the channel walls.

The nozzle 100 comprises an inner channel 102 for receiving the melted core polymer component and an outer channel 104 for receiving the melted cladding polymer component. The core polymer component may be fed to the inner channel 102 through a central delivery channel of the coextrusion head, whereas the cladding polymer component may be fed to the outer channel 104 through a ring channel (as depicted in FIG. 1) or a side channel of the coextrusion head.

A joining path 106 located at an end segment of the dual-channel nozzle 100 is hydraulically connected to the inner channel 102 and the outer channel 104. The end segment also comprises a tapering where the outer channel 104 is guided toward the center. The fluid core polymer component can be fed through the inner channel into the joining path 106, where it can be brought into contact with the fluid cladding polymer component by simultaneous feeding.

Figure 2:
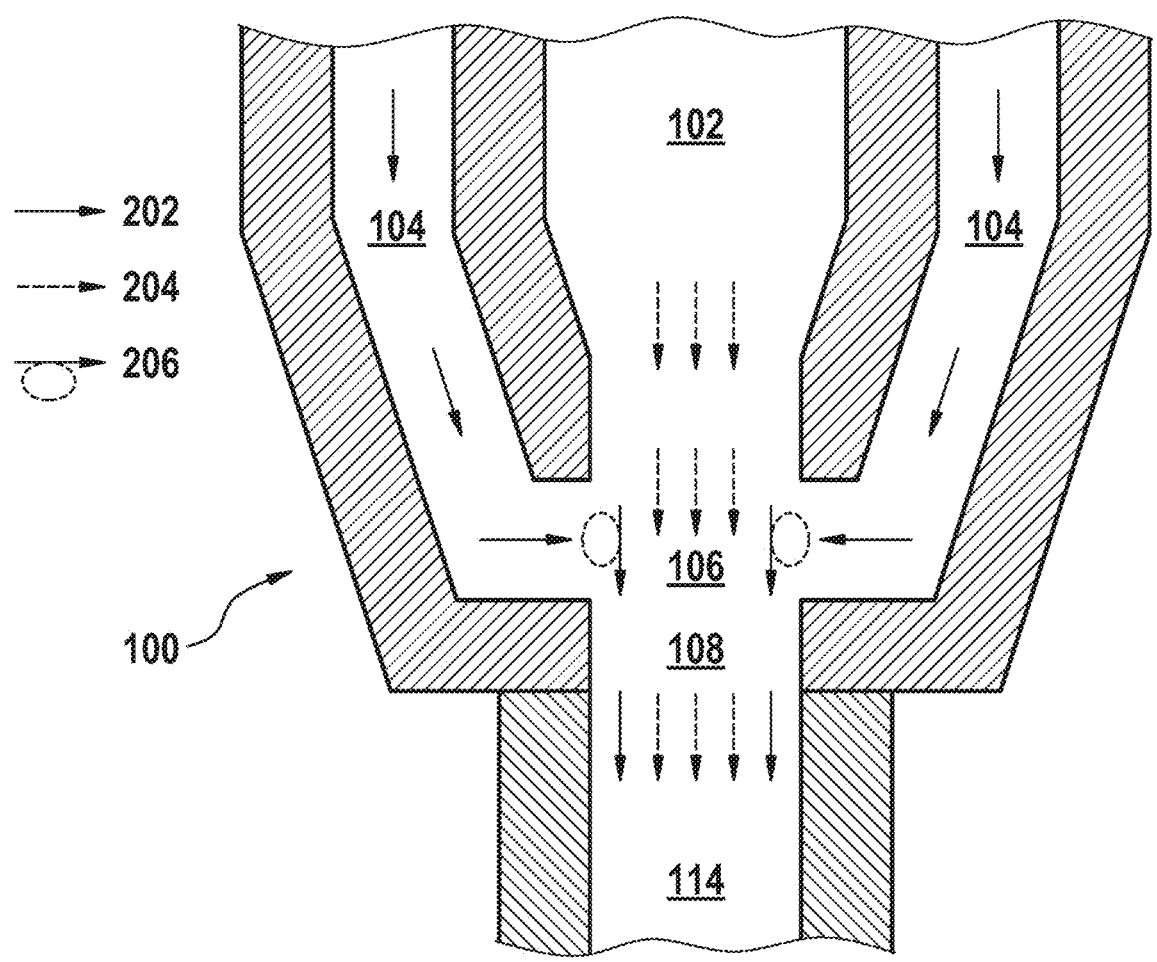
FIG. 2 is a CAD drawing showing an exploded view of channel plates.

The flow characteristics of the core polymer component and the cladding polymer component in the joining path 106 are visualized in FIG. 2. Process parameters, mainly temperature and feed rates, are chosen such that a balance between laminar flow 202, 204 and turbulent flow 206 is achieved in the joining path 106. A purely laminar flow 202, 204 would result in comparably weak cohesive bonding between core and cladding as the molecules from both components do not mix significantly. On the other hand, a pronouncedly turbulent flow 206 would cause instabilities which would destroy the core-cladding structure at least locally.

Therefore, the process parameters are preferably balanced such that a small-scale turbulence is created where the core and cladding molecules mix within a thin contacting zone of nearly constant width around the core. The contacting zone constitutes a transition zone where the molecular densities of core polymer and cladding polymer merge without creating a cohesive interface. This way, a bond strength between core and cladding may be obtained which surpasses bonding forced which can be achieved by cohesive bonding.

The joining path 106 is structured in a way which favors the induction of the turbulent velocity field 206 into the streaming pattern 204 of the core polymer component. In response, a velocity field is created with a pronounced change of direction on a small scale, which can be converted into a static turbulent velocity field 206 by continuous mass transport.

In addition, FIG. 2 illustrates the interplay between mechanical constraints and length scales for the formation and maintenance of a stable turbulence. First, it is noted that the outlet of the inner channel 102 and the nozzle outlet 108 are equally dimensioned. This is in contrast to the mass flow, which solely consists of the core polymer component in the outlet of the inner channel 102, but exits the nozzle outlet 108 as a joined polymer strand comprising the core polymer mixture, the cladding polymer component, and the contact layer interfacing the two coextrusion components. This causes mechanical stress upon the core polymer component, mainly in the turbulence region 206, indicated by turbulence arrows 206 at the perimeter of the joining path 106 where the streams of the core polymer component and the cladding polymer component, which are directed against each other, get into mutual contact.

The walls which define the outlet of the inner channel 102, the outlet(s) of the outer channel 104, and the nozzle outlet 108, pose mechanical constraints to the converging mass flows within close mutual distances which define a typical dimension of the turbulence region 206, i.e., a typical length scale of space which is available for the formation of turbulence 208. Thus, a stable turbulent mass flow 206 is induced which cannot be larger than the mentioned typical length scale (due to the mechanical constraints provided by the structure), and which cannot be substantially smaller than the typical length scale for turbulence due to lack of mechanical constraints on this scale.

Preferably, the joining path 106 is structured and dimensioned in a way which allows for creating a stable turbulence 206 which is sufficiently large for connecting the two coextrusion components, but also sufficiently small so that enough non-mixed material remains for both core and cladding in order to properly perform their respective functions. For this purpose, it is necessary to choose the structure and dimensions of the joining path 106 such that the defined length scale for turbulence 206 is in the desired range according to these considerations. In an example, the structure and dimensions of the joining path are chosen such that the thickness of the resulting contact layer is between 5 and 25 percent of the smallest diameter of the coextruded monofilament (the diameter being measured across a line through the center of the core).

The strand of joined components is pressed out of the joining path 106 through a nozzle outlet 108 into a coextrusion path 114 which ends in an extrusion opening 116. The contour of the opening corresponds to the perimeter of the bicomponent polymer fiber to be produced. In an example, the extrusion opening 116 comprises two circular or ellipsoidal sections which are located on two opposite sides from the extended central axis of the nozzle 100 and which are connected to each other via two long, narrow protrusion gaps located on two further opposite sides from the central axis. The circular or ellipsoidal sections of the opening 116 have a radius which is larger than the radius of the core strand leaving the nozzle 100. Hence, the center of the joined strand pressed through the opening 116 may comprise the core strand surrounded by circular or ellipsoidal sections of the cladding. The protrusion gaps are filled by the cladding polymer component only.

In addition to the flow characteristics in the joining path 106, turbulence must also be controlled in the coextrusion path 114. The coextrusion path 114 extends from the rim of the nozzle 100 to the bottom of the extrusion opening 116 where the joined strand leaves the coextrusion head as a bicomponent fiber. A turbulent flow is permissible here as it may cause the cladding to fill the protrusion gaps uniformly and completely up to their outer corners, which cannot be achieved with a purely laminar flow. However, too strong turbulence is not desirable as it may destroy the contact layer just formed in the joining path 106.

The flow characteristics in the joining path 106 and in the coextrusion path 114 are also influenced by design parameters of the coextrusion head. For instance, the length $x_1$ of the joining path 106 may be selected according to the specific combination of polymer materials which are to be processed by the coextrusion setup. A parameter which similarly depends on the specific combination of polymers and which may allow for controlling the flow characteristics in the coextrusion path 114 independently from the joining path 106 is the length $x_2$ of the coextrusion path 114.

The coextrusion head may be implemented with a design which supports the dual-channel design of the nozzles 100. Preferably, the coextrusion head is a heated plate coextrusion head or spinneret plate where each of the two components is distributed through hierarchical channels towards a series of extrusion openings 116 where a plurality of bicomponent fibers can be produced in parallel.

Figure 3:
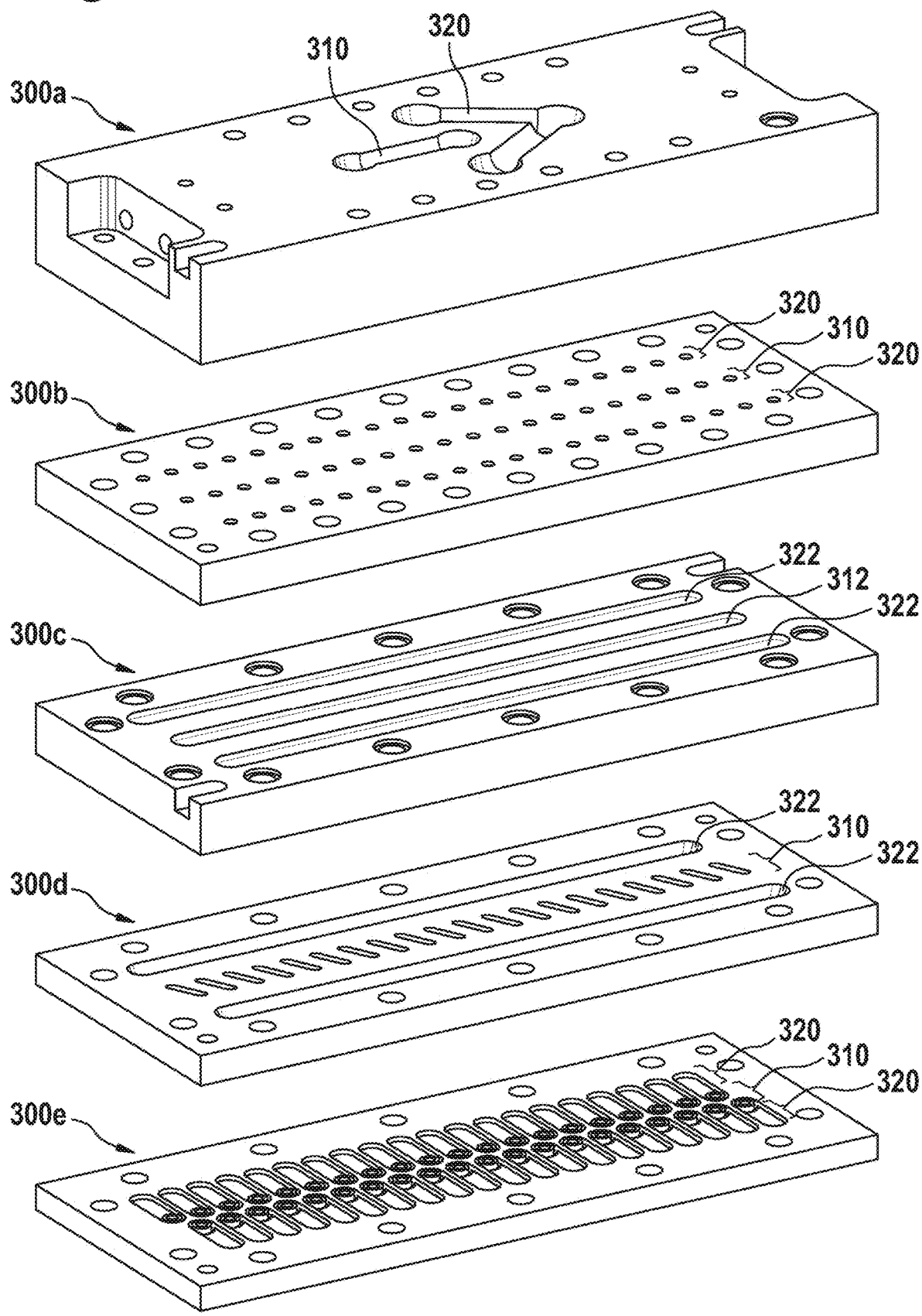
FIG. 3 is a CAD cut through a coextrusion head illustrating first channels in a hierarchical design.
Figure 4:
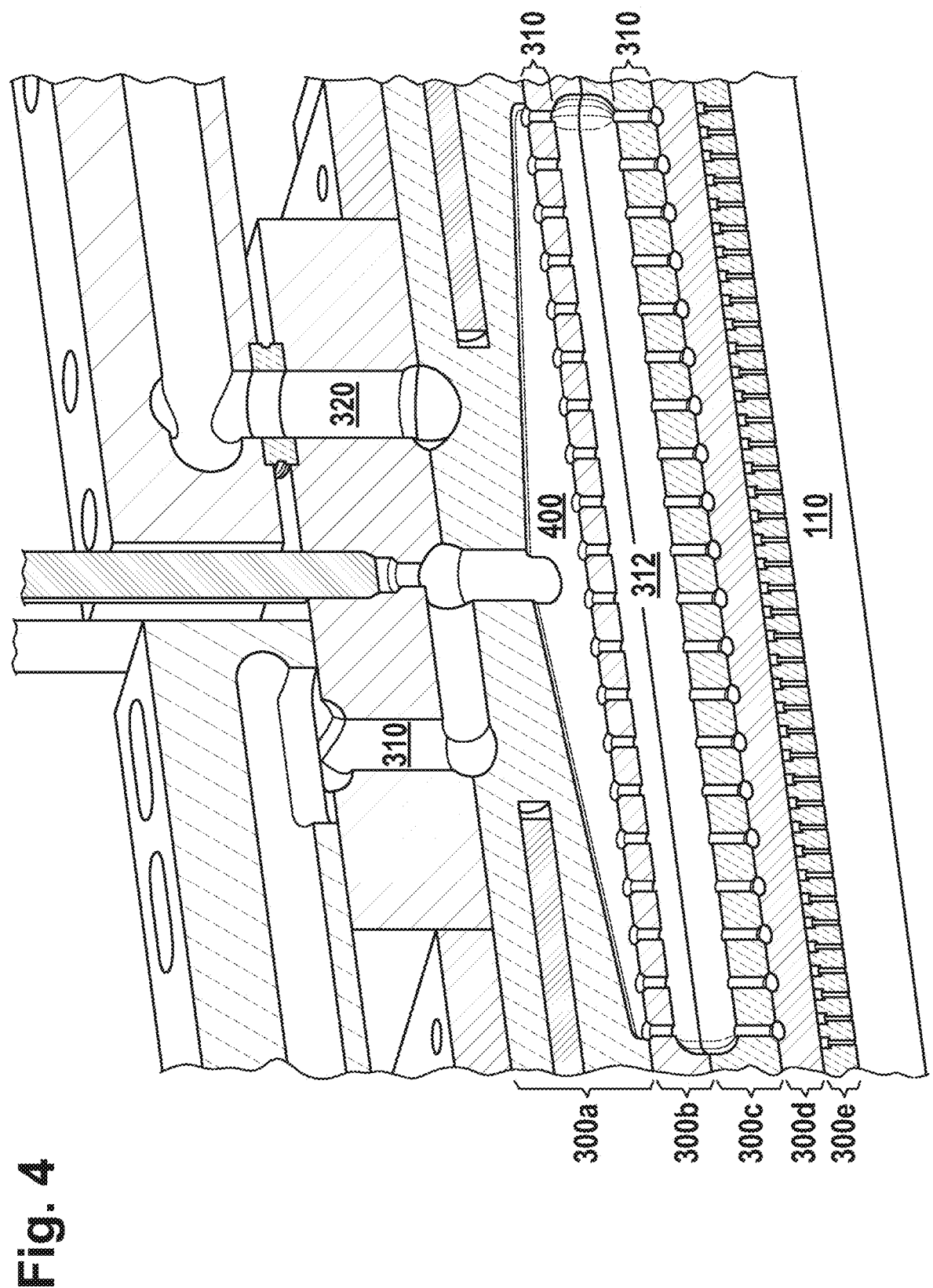
FIG. 4 is a CAD cut through a coextrusion head illustrating second channels in a hierarchical design.
Figure 5:
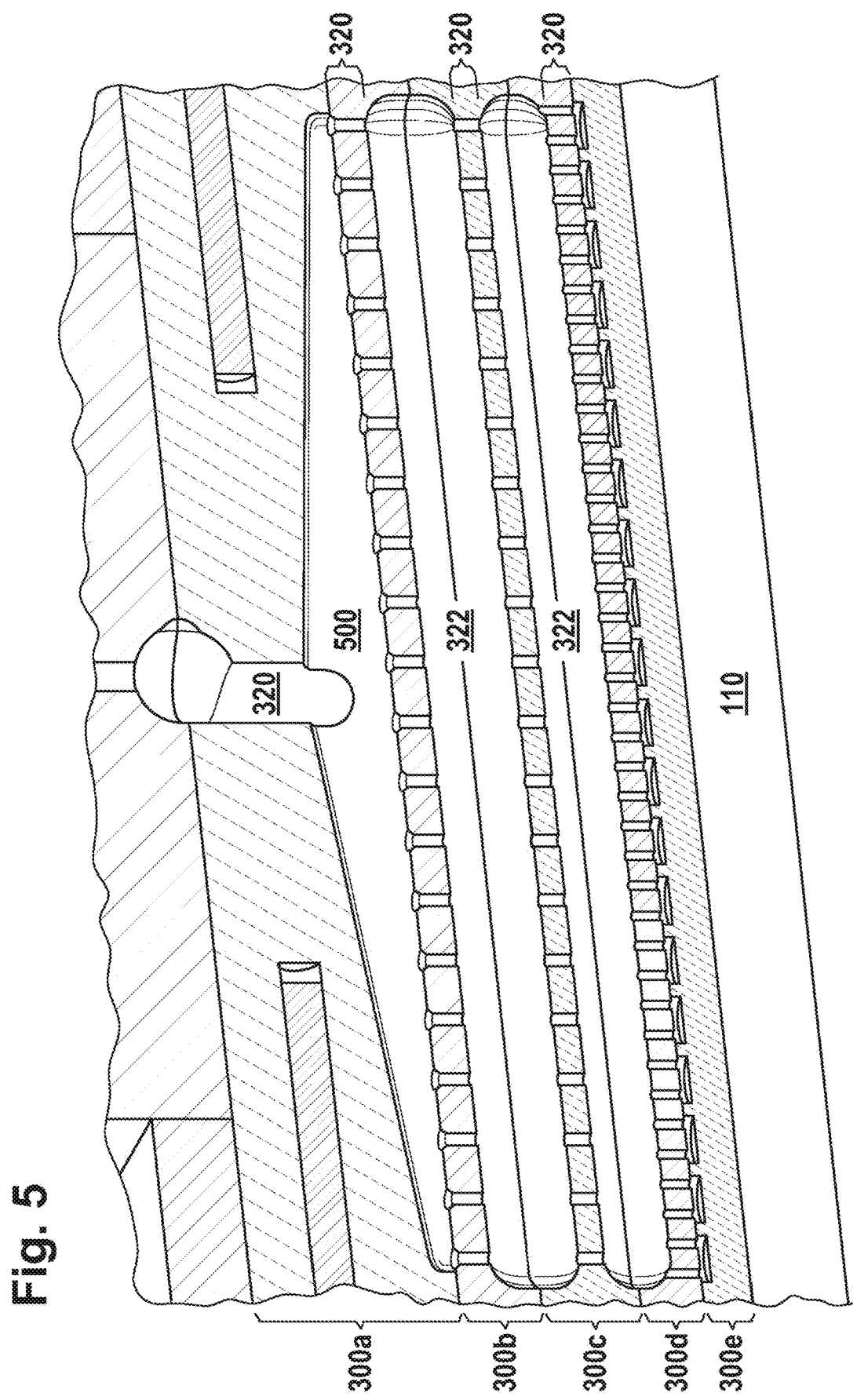
FIG. 5 demonstrates the flow of fluid core polymer component and fluid cladding polymer component during coextrusion.

FIGS. 3 to 5 illustrate an exemplary design of a coextrusion head assembly comprising a stack of channel plates 300. FIG. 3 shows an exploded view of a set of channel plates 300 for distributing the two polymer components to twenty coextrusion nozzles. Each channel plate 300 comprises channels of a defined width or diameter which connect either the first inlet (not shown) with the inner channel 102 of each dual-channel nozzle 100 or the second inlet (not shown) with the outer channel 104 of each dual-channel nozzle 100. The two channel types are responsible for distributing each of the two flow streams from the inlets with a large diameter to the small extrusion openings 116, wherein the large diameter corresponds to system parameters of mentioned single-component extrusion units upstream the coextrusion head and the dimensions of the extrusion openings correspond to the radial dimensions of the bicomponent polymer fibers to be produced, which are typically in the micrometer to millimeter range.

In order to distribute the two flow streams to the extrusion openings 116 with a homogeneous pressure distribution, the plates 300 are mounted upon each other with the channels arranged in a manner which enables a subsequent flow of the components through all channel plates 300, hence establishing a hierarchical order where the first channel plate 300a comprises channels with the largest diameter, followed by the second plate 300b with smaller channel diameters than the first, but still larger than the third, etc. The last channel plate 300 comprises the channels for both components in dimensions which are close to those of the channels 102, 104 inside the dual-channel nozzles 100 which are mounted in an extrusion plate 110 downstream the last channel plate 300, the channels ending in the center, ring and/or side delivery channels mentioned above.

The pressure of each polymer component can be equalized further between the coextrusion nozzles 100 by providing pressure chambers 312, 322 in at least one of the channel plates 300. On one hand, each component is supposed to be distributed from large to small diameters in order to obtain bicomponent polymer fibers with the desired dimensions. This may lead to increased interaction as the surface-to-mass ratio increases with every hierarchy step. On the other hand, the coextrusion nozzles 100 span at least one width of the coextrusion head, i.e. the nozzles 100 cover a cross-sectional area which is larger than the inlet diameters. The mentioned surface effects may thus lead to a smaller pressure at the outer channels of the head. Furthermore, it is desirable to spread the mass flow between subsequent plates 300 into as many parallel channels as possible to simplify and miniaturize the design of the coextrusion head. This may intensify surface forces between subsequent plates 300, preventing a homogeneous pressure distribution.

A pressure chamber 312, 322 may effectively compensate for the described surface selective pressure loss by offering the liquid polymers additional space in flow direction to achieve a vertical equalization of local pressure in outlet channels of the pressure chamber. The outlet channels can be on the same or the next smaller hierarchy step; a return to larger channel dimensions would be a design inefficiency as this would counteract the hierarchical channel structure.

The exemplary coextrusion head of FIGS. 3 to 5 uses the five channel plates 300a to 300e shown in FIG. 3 to distribute the two polymer components to forty dual-channel nozzles 100. Mass flow is directed from the first plate 300a at the top of FIG. 3 to the fifth plate 300e at the bottom. The first plate 300a receives the core polymer component with the straight left channel on the upper side and the cladding polymer component at the tip of the "V" shaped right channel visible on the upper side.

The straight channel is a first channel 310 and continues as a vertical feed to the first 1:20 distribution chamber 400 seen as a hanger-shaped structure in FIG. 4. From first to fourth plate 300d, the first channels 310 stay in the center of the plates 300, i.e. the central line of twenty channels on the second plate 300b are first channels 310, connecting to the central pressure chamber 312 on the third plate 300c which is discharged by twenty further first channels 310 in the third plate 300c. On the bottom of the third plate 300c, each of the twenty first pressure chamber discharge channels splits up into two small channels which connect to the circular feed holes on the fifth plate 300e for the inner channels 102 of the dual-channel nozzles 100.

The "V" shaped channel on the first plate 300a is a second channel 320 and continues as two vertical feeds to the second 1:20 distribution chambers 500 at the front and, respectively, the back side of the first plate 300a. Another cut through the CAD model is shown in FIG. 5 to visualize the layout of second channels 320 in the rear system. The twenty second channels 320 of the second plate 300b connect to an upper pressure chamber 322 on the third plate 300c which is discharged by twenty further second channels 320 in the third plate 300c. However, the cladding polymer must be distributed into the outer channels 104 of the dual-channel nozzles 100. As can be seen in FIG. 1, each outer channel 104 surrounds the inner channel 102 of the respective nozzle 100, and it is desirable to maintain a mass flow with equalized pressure also along the whole perimeter of the outer channel 104. Therefore, the upper pressure chamber 322 connects to a lower pressure chamber 322 on the fourth plate 300d which is discharged by forty second channels 320, each two of which supplying the cladding polymer component to one of the flat feed channels on the fifth plate 300e which each lead to one of the ring channels for feeding the outer channel 104 of one dual-channel nozzle 100.

Another beneficial effect of a channel plate design may be a simplified cleaning procedure where the plates 300 are detached from each other and cleaned at e.g. 750° C. in a pyrolysis oven. The hierarchical channels may be manufactured with dimensional tolerances allowing for proper realignment of the plates 300 when being put together e.g. after maintenance or cleaning. The dual-channel nozzles 100 may further support this flexibility when implemented as exchangeable parts which can be pushed through holes in the last channel plate 300 for being inserted into the heating channels 112 of the extrusion plate 110 downstream the last channel plate 300 upon (re-)assembly of the coextrusion head.

LIST OF REFERENCE NUMERALS 100 dual-channel nozzle
102 inner channel
104 outer channel
106 joining path
108 nozzle outlet
110 extrusion plate
112 heating channel
114 coextrusion path
116 extrusion opening
202 flow direction of cladding polymer component
204 flow direction of core polymer component
206 turbulent flow
300 channel plate
310 first channel
312 first pressure chamber
320 second channel 322 second pressure chamber
400 first distribution chamber
500 second distribution chamber

The invention claimed is:

1. A coextrusion head for manufacturing a bicomponent polymer fiber, the coextrusion head comprising:
    a first inlet configured to receive a core polymer component;
    a second inlet configured to receive a cladding polymer component;
    a dual-channel nozzle, the dual-channel nozzle including,
        an inner channel, and
        an outer channel encompassing the inner channel, the inner channel being in hydraulic connection with the first inlet, the outer channel being in hydraulic connection with the second inlet; and
    a joining path establishing a hydraulic connection between the inner channel, the outer channel, and a nozzle outlet of the dual-channel nozzle, the joining path configured to bring the core polymer component and the cladding polymer component into contact with each other such that a contact layer is formed between the core polymer component and the cladding polymer component in response to simultaneously receiving the core polymer component from the inner channel and the cladding polymer component from the outer channel, the contact layer including a mixture of the core polymer component and the cladding polymer component, wherein the coextrusion head comprises at least two of the dual-channel nozzle and a hierarchical stack of channel plates, each of the channel plates comprising at least one first channels and at least one second channels, the at least one first channels establishing the hydraulic connection between the first inlet and each inner channel of the at least two dual-channel nozzles, the at least one second channels establishing the hydraulic connection between the second inlet and each outer channel of the at least two dual-channel nozzles, a number of the at least one first and second channels per channel plate being constant or increasing in downstream direction.

2. The coextrusion head of claim 1, wherein the channel plates are detachable from and reattachable to each other.

3. The coextrusion head of claim 1, wherein the at least two dual-channel nozzles are exchangeable parts, one of the channel plates at a most downstream position within the hierarchical stack of channel plates being an extrusion plate, at least one of the channel plates preceding the extrusion plate comprising a respective through hole for each of the at least two dual-channel nozzles, the extrusion plate comprising a respective heating channel for each of the at least two dual-channel nozzles, the heating channels and the through holes being aligned with each other to form cavities, each of the cavities comprising one of the at least two dual-channel nozzles, each of the heating channels further comprising an extrusion opening, each extrusion opening being in hydraulic connection with the nozzle outlet of the dual-channel nozzle contained in the cavity formed by said heating channel.

4. The coextrusion head of claim 3, wherein each heating channel comprising a recess configured to receive one of the at least two dual-channel nozzles.

5. The coextrusion head of claim 1, wherein the channel plates being adapted for pyrolytic removal of polymer rests at temperatures between 450 and 750° C.

6. A coextrusion system, comprising the coextrusion head according to claim 1, a first feeder for feeding the core polymer component through the first inlet, and a second feeder for feeding the cladding polymer component through the second inlet.

* * * * *